US 11,199,901 B2

(12) United States Patent
Klein et al.

(10) Patent No.: US 11,199,901 B2
(45) Date of Patent: Dec. 14, 2021

(54) AUGMENTING THE FUNCTIONALITY OF NON-DIGITAL OBJECTS USING A DIGITAL GLOVE

(71) Applicant: Microsoft Technology Licensing, LLC, Redmond, WA (US)

(72) Inventors: Christian Klein, Duvall, WA (US); Andrew Stuart Glass, Seattle, WA (US); Sang Ho Yoon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/207,973

(22) Filed: Dec. 3, 2018

(65) Prior Publication Data
US 2020/0174567 A1 Jun. 4, 2020

(51) Int. Cl.
*G06F 3/01* (2006.01)
*G06N 20/00* (2019.01)
(Continued)

(52) U.S. Cl.
CPC .............. *G06F 3/014* (2013.01); *G06F 3/017* (2013.01); *G06F 3/03545* (2013.01); *G06F 3/04847* (2013.01); *G06N 20/00* (2019.01)

(58) Field of Classification Search
None
See application file for complete search history.

(56) References Cited

U.S. PATENT DOCUMENTS

| 6,029,214 A | 2/2000 | Dorfman et al. |
| 6,701,296 B1 | 3/2004 | Kramer et al. |

(Continued)

FOREIGN PATENT DOCUMENTS

| CN | 102236455 A | 11/2011 |
| CN | 108153450 A | 6/2018 |

(Continued)

OTHER PUBLICATIONS

"Non Final Office Action Issued in U.S. Appl. No. 16/207,794", dated Dec. 19, 2019, 24 Pages.
(Continued)

*Primary Examiner* — Carl Adams
(74) *Attorney, Agent, or Firm* — Newport IP, LLC; Jacob P. Rohwer

(57) ABSTRACT

The disclosed technologies address technical problems, including improving human-computer interaction, by augmenting the functionality provided by non-digital objects using a digital glove. To provide this functionality, a machine learning model is trained using sensor data generated by sensors in a digital glove and data generated by a user input device while the digital glove is utilized to manipulate an object like a user input device. Once trained, the machine learning model can take sensor data generated by a digital glove while manipulating a non-digital object and generate virtual user input device data that can be utilized to control a host computer. A digital glove can also be utilized to perform selection operations using non-digital objects when pressure data generated by one or more of the pressure sensors in the digital glove indicates that pressure was exerted at a finger of the digital glove in excess of a threshold value.

18 Claims, 13 Drawing Sheets

(51) Int. Cl.
*G06F 3/0354* (2013.01)
*G06F 3/0484* (2013.01)

(56) References Cited

U.S. PATENT DOCUMENTS

| | | | |
|---|---|---|---|
| 6,885,361 B1 | 4/2005 | Harvill et al. | |
| 9,996,153 B1 | 6/2018 | Trotta | |
| 2004/0169636 A1* | 9/2004 | Park | G06F 3/016 345/156 |
| 2006/0071915 A1 | 4/2006 | Rehm | |
| 2006/0248478 A1 | 11/2006 | Liau | |
| 2010/0231505 A1 | 9/2010 | Iwata | |
| 2011/0022393 A1 | 1/2011 | Waller et al. | |
| 2011/0047459 A1 | 2/2011 | Van Der Westhuizen | |
| 2011/0209097 A1 | 8/2011 | Hinckley | |
| 2011/0273380 A1 | 11/2011 | Martin | |
| 2012/0030606 A1 | 2/2012 | Zhang | |
| 2012/0127071 A1 | 5/2012 | Jitkoff et al. | |
| 2012/0154295 A1 | 6/2012 | Hinckley et al. | |
| 2013/0113717 A1 | 5/2013 | Van Eerd | |
| 2013/0120434 A1 | 5/2013 | Kim | |
| 2013/0203469 A1 | 8/2013 | Cho et al. | |
| 2013/0249806 A1 | 9/2013 | Crisan | |
| 2013/0249870 A1 | 9/2013 | Slaby et al. | |
| 2013/0300674 A1 | 11/2013 | Davidson | |
| 2014/0123049 A1 | 5/2014 | Buxton et al. | |
| 2014/0191977 A1 | 7/2014 | Feng et al. | |
| 2014/0306897 A1 | 10/2014 | Cueto | |
| 2014/0337804 A1 | 11/2014 | Hwang et al. | |
| 2014/0363074 A1 | 12/2014 | Dolfing et al. | |
| 2014/0365949 A1 | 12/2014 | Xia et al. | |
| 2015/0130727 A1 | 5/2015 | Kim | |
| 2015/0153949 A1 | 6/2015 | Yeung et al. | |
| 2015/0193051 A1 | 7/2015 | Hung | |
| 2016/0054797 A1 | 2/2016 | Tokubo et al. | |
| 2016/0124532 A1 | 5/2016 | Wolff et al. | |
| 2016/0170547 A1 | 6/2016 | Zhang et al. | |
| 2016/0187973 A1 | 6/2016 | Shankar et al. | |
| 2016/0202778 A1 | 7/2016 | Su | |
| 2016/0246369 A1 | 8/2016 | Osman | |
| 2016/0342207 A1 | 11/2016 | Beran | |
| 2016/0349989 A1 | 12/2016 | Yu et al. | |
| 2017/0086519 A1 | 3/2017 | Vigano' et al. | |
| 2017/0109020 A1* | 4/2017 | Sliter | G06F 3/04883 |
| 2017/0177077 A1 | 6/2017 | Yang et al. | |
| 2017/0231304 A1 | 8/2017 | Provencher | |
| 2017/0262056 A1 | 9/2017 | Osman | |
| 2017/0285932 A1 | 10/2017 | Hastings et al. | |
| 2018/0004406 A1 | 1/2018 | Jung et al. | |
| 2018/0032203 A1 | 2/2018 | Sepulveda et al. | |
| 2018/0046269 A1 | 2/2018 | Kaplan | |
| 2018/0074637 A1 | 3/2018 | Rosenberg et al. | |
| 2018/0107277 A1 | 4/2018 | Keller et al. | |
| 2018/0120985 A1 | 5/2018 | Wallace et al. | |
| 2018/0260796 A1 | 9/2018 | Mcdonald et al. | |
| 2018/0328808 A1 | 11/2018 | Jourdan et al. | |
| 2018/0335921 A1 | 11/2018 | Karunamuni et al. | |
| 2018/0356893 A1* | 12/2018 | Soni | G06F 3/0346 |
| 2019/0005733 A1 | 1/2019 | Wehner et al. | |
| 2019/0102927 A1 | 4/2019 | Yokokawa | |
| 2019/0129473 A1 | 5/2019 | Hu et al. | |
| 2020/0026352 A1* | 1/2020 | Wang | G06F 3/038 |
| 2020/0174566 A1 | 6/2020 | Klein et al. | |
| 2020/0174653 A1 | 6/2020 | Klein et al. | |
| 2020/0174660 A1 | 6/2020 | Klein et al. | |

FOREIGN PATENT DOCUMENTS

| | | |
|---|---|---|
| WO | 2012028773 A1 | 3/2012 |
| WO | 2014133217 A1 | 9/2014 |
| WO | 2016036509 A1 | 3/2016 |
| WO | 2016097841 A2 | 6/2016 |

OTHER PUBLICATIONS

"Non Final Office Action Issued in U.S. Appl. No. 16/207,840", dated Dec. 12, 2019, 14 Pages.

"Notice of Allowance Issued in U.S. Appl. No. 16/207,936", dated Oct. 4, 2019, 10 Pages.

"International Search Report and Written Opinion Issued in PCT Application No. PCT/US19/063120", dated Feb. 27, 2020, 12 Pages. (MS# 405535-WO-PCT).

"International Search Report and Written Opinion Issued in PCT Application No. PCT/US19/063128", dated Feb. 27, 2020, 11 Pages. (MS# 405656-WO-PCT).

"International Search Report and Written Opinion Issued in PCT Application No. PCT/US2019/063118", dated Jan. 31, 2020, 11 Pages.

"Non Final Office Action Issued in U.S. Appl. No. 16/207,892", dated Mar. 5, 2020, 28 Pages.

"International Search Report and Written Opinion Issued in PCT Application No. PCT/US19/063125", dated Apr. 3, 2020, 19 Pages. (MS# 405256-WO-PCT).

"International Search Report and Written Opinion Issued in PCT Application No. PCT/US2019/063119", dated Jun. 24, 2020, 23 Pages. (MS# 405245-WO-PCT).

"Non Final Office Action Issued in U.S. Appl. No. 16/207,892", dated Jul. 23, 2020, 33 Pages. (MS# 405256-US-NP).

"Final Office Action Issued in U.S. Appl. No. 16/207,840", dated Sep. 3, 2020, 20 Pages. (MS# 405535-US-NP).

"Final Office Action Issued in U.S. Appl. No. 16/207,892", dated Dec. 24, 2020, 37 Pages. (MS# 405256-US-NP).

"Notice of Allowance Issued in U.S. Appl. No. 16/207,794", dated Jun. 7, 2021, 17 Pages. (MS# 405245-US-NP).

"Non Final Office Action Issued in U.S. Appl. No. 16/207,840", dated Jun. 8, 2021, 24 Pages. (MS# 405535-US-NP).

Annett, Michelle, "(Digitally) Inking in the 21st Century", In Journal of IEEE Computer Graphics and Applications, vol. 37, Issue 1, Jan. 2017, pp. 92-99.

Lee, et al., "SketchInsight: Natural Data Exploration on Interactive Whiteboards Leveraging Pen and Touch Interaction", In Journal of IEEE Pacific Visualization Symposium, Apr. 14, 2015, pp. 199-206.

"Final Office Action Issued in U.S. Appl. No. 16/207,794", dated Jul. 1, 2020, 26 Pages. (MS# 405245-US-NP).

"Non Final Office Action Issued in U.S. Appl. No. 16/207,892", dated Mar. 30, 2021, 42 Pages. (MS# 405256-US-NP).

"Final Office Action Issued in U.S. Appl. No. 16/207,892", dated Aug. 27, 2021, 37 Pages.

* cited by examiner

AUGMENTING THE FUNCTIONALITY OF NON-DIGITAL OBJECTS USING A DIGITAL GLOVE

BACKGROUND

Computers can utilize many different types of user input devices: touchscreens; mice; digital pens; digital dials; eye tracking systems; and motion tracking systems, just to name a few. Traditional user input devices such as these can be utilized to control computing systems in many different ways. However, user input devices such as these also suffer from a number of drawbacks. For example, traditional user input devices can be expensive, require power such as from batteries for instance, and can be prone to malfunctioning or becoming completely inoperative. Traditional user input devices are also typically "one size fits all." For example, digital dials and computer mice are usually available only in one size. This can be frustrating to users for whom another size would be more comfortable, such as users with large or small hands for instance.

It is with respect to these and other technical challenges that the disclosure made herein is presented.

SUMMARY

Technologies are disclosed herein for augmenting the functionality provided by non-digital objects using a digital glove. In particular, the disclosed technologies address the technical problems described above by enabling a user of a digital glove to use non-digital objects to control aspects of the operation of a host computer. For example, common non-digital objects like cups, non-digital writing implements, notebooks, planar surfaces like tables, and others, can be used to control a host computer in a manner that is similar to the way in which a traditional digital user input device would be utilized to control the host computer. In this way, inexpensive non-digital items can be used to control a host computer rather than traditional digital user input devices, thereby saving power, allowing greater customization for the physical requirements of individual users, and eliminating the possibility of failure. Through implementations of the disclosed technologies, human-computer interaction can be improved, thereby improving the overall operation of computing systems that implement the disclosed technologies.

Other benefits of the disclosed technologies include the ability to enable new types of functionality using new non-digital objects that can be delivered via a software update rather than requiring the purchase of a new hardware accessory. For example, a user might create a new module for using a new non-digital object (e.g. a table-tennis paddle or a hammer) with a digital glove. Installing the new module would be sufficient for the new interaction to be enabled when the digital glove is used to manipulate the non-digital object. Other technical benefits not specifically mentioned herein can also be realized through implementations of the disclosed subject matter.

In order to realize the technical benefits mentioned briefly above, and potentially others, the technologies disclosed herein are implemented in conjunction with a digital glove. A digital glove is a glove that has been configured with sensors to detect the pose of the wearer's (who also might be referred to as a "user") hand and pressure exerted at the fingertips of their hand. For instance, the fingers of a digital glove can be equipped with flex/bend/stretch sensors (referred to herein as "flex sensors") capable of detecting the amount of flex or bend in a wearer's fingers. Some flex sensors utilize capacitive/piezoresistive sensing.

Tactile pressure sensors (which might be referred to herein as "pressure sensors"), which might also utilize capacitive/piezoresistive sensing, can also be mounted in the fingertips of a digital glove to sense the amount of pressure at the fingertips of a wearer. An inertial measurement unit ("IMU") might also be included in a digital glove to detect the pronation and supination of the wearer's hand. Digital gloves can also, or alternately, include other types of sensors in order to detect other aspects of the pose or position of a user's hand. Digital gloves can also include output devices, such as haptic devices such as those including LRA, ERM, voice-coil, and various types of actuating hardware, to provide feedback to a wearer.

Digital gloves are typically paired with a host computer and include appropriate hardware to transmit sensor data to the host computer. For example, a digital glove can transmit flex data to a host computer that describes the flex in the joints of a wearer's fingers, pressure data indicating the pressure exerted at the fingertips of a wearer, and IMU data describing the pronation and supination of the wearer's hand. A digital glove can also receive instructions from the host computer to activate haptics or other types of feedback in a digital glove. As will be described in detail below, a digital glove such as that described briefly above and a host computer can be configured to augment the functionality of non-digital objects such as, but not limited to, cups, non-digital writing implements like pens or pencils, notebooks, planar surfaces like tables, and others.

In order to provide this functionality, a machine learning model is trained using sensor data generated by the sensors in a digital glove when the digital glove is used to manipulate an object, such as a user input device or a non-digital object. For example, a machine learning model can be trained using sensor data generated by the sensors in a digital glove and data generated by a user input device, referred to herein as "user input device data," while the digital glove is utilized to manipulate the user input device. For example, and without limitation, a wearer of a digital glove might operate a digital dial by spinning the digital dial in different directions and at different speeds. Sensor data is collected from the sensors in the digital glove while the user is spinning the digital dial. For example, flex data describing the flex in the wearer's fingers while spinning the digital dial can be collected. Data output by the digital dial is also collected from the digital dial during manipulation. A machine learning model can then be trained on the sensor data obtained from the digital glove and the corresponding user input device data obtained from the digital dial during manipulation. In this example, the trained machine learning model can map sensor data obtained from a digital glove to rotation intent (e.g. the rotation of a dial).

Once trained, the machine learning model can take sensor data generated by a digital glove while manipulating a non-digital object and generate virtual user input device data that can be utilized to control a host computer. Continuing the example above, for instance, a wearer of a digital glove might rest their gloved hand on a non-digital object, such as a coffee cup. The user might select a coffee cup with a size and diameter that is comfortable to grasp. The user might then rotate the coffee cup in a manner similar to that used to rotate a digital dial. Sensor data generated by the sensors in the digital glove are obtained while the user is rotating the coffee cup. The sensor data can then be input to the trained machine learning model which, in turn, outputs virtual user input device data. The virtual user input device data can then be utilized to control the host computer. In this way, the coffee cup can be utilized to control aspects of the operation of the host computer in the same way that a digital dial would.

A digital glove can also be utilized to perform selection operations, such as a click of a mouse button or digital dial, using non-digital objects. For example, pressure data can be obtained from the pressure sensors of a digital glove while the digital glove is being used to manipulate a non-digital object. A host computer can then determine if pressure data generated by one or more of the pressure sensors in the digital glove indicates that pressure was exerted at one of the fingers in excess of a threshold value. If so, the host computer can perform a selection operation.

Continuing the example above, for instance, a user holding a coffee cup with their gloved hand might exert pressure on the cup using one or more of their fingers. If the pressure exceeds a threshold value, a selection operation will be performed on the host computer in the same manner as if the user had clicked the button on a digital dial. A command might also be provided to the digital glove to provide haptic feedback to the wearer of the glove in the event that pressure in excess of a threshold value is detected at one of the fingers.

In some configurations, end users can train a machine learning model such as that described above using their own non-digital object, which might be appropriate to a user's particular trade or specialization. The user would record and train the machine learning model with their choice of non-digital object, and then identify triggers to associate with actions in the computing device. The user's choice of non-digital object can then be utilized to control a computing device using a digital glove in the manner described briefly above and in further detail below.

It should be appreciated that various aspects of the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
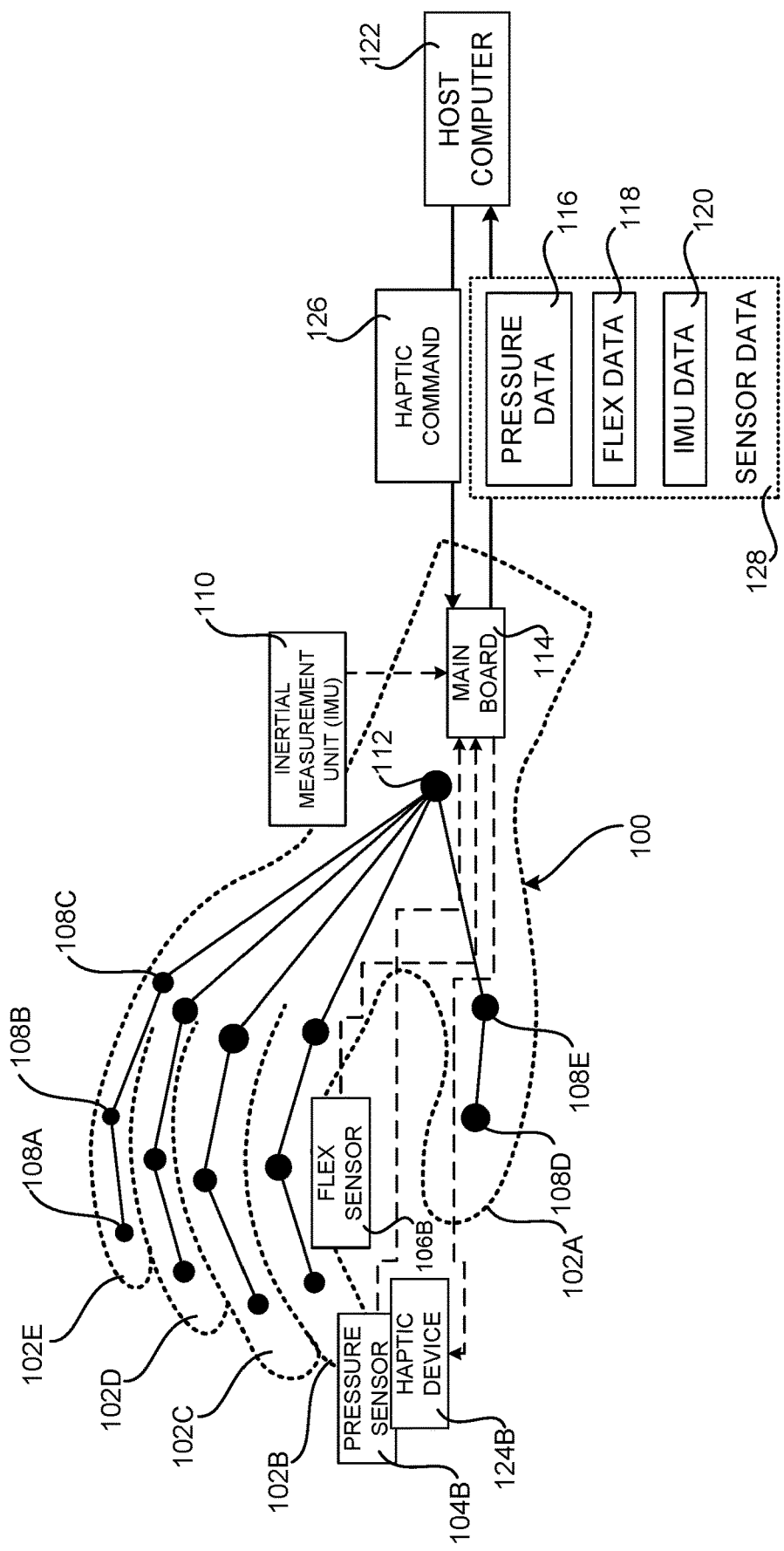
FIG. 1 is a computing architecture diagram that shows aspects of the configuration and operation of an illustrative digital glove utilized in various embodiments disclosed herein.

The following detailed description is directed to technologies for augmenting the functionality provided by non-digital objects using a digital glove. As discussed briefly above, implementations of the disclosed technologies can improve human-computer interaction, thereby improving the overall operation of computing systems that implement the disclosed technologies. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for augmenting the functionality provided by non-digital objects using a digital glove will be described.

FIG. 1 is a computing architecture diagram that shows aspects of the configuration and operation of an illustrative digital glove 100 utilized in various embodiments disclosed herein. As described briefly above, a digital glove 100 is a glove that has been configured with sensors to detect the pose of the wearer's (who also might be referred to as a "user") hand and pressure exerted at the fingertips of the user's hand. For instance, the fingers 102A-102E of a digital glove 100 can be equipped with flex sensors 106 capable of detecting the amount of flex or bend in a wearer's fingers. Some flex sensors utilize capacitive/piezoresistive sensing, but other flex sensors based on other technologies can also be utilized.

In the example configuration shown in FIG. 1, only a single flex sensor 106B has been illustrated in the index finger 102B of the digital glove 100 for ease of reference. It is to be appreciated, however, that the digital glove 100 can be configured with one or more flex sensors 106 in each of the fingers 102A-102D.

The flex sensors 106 can be mounted in the digital glove 100 such that the flex of the joints of a user's hand can be measured. For example, the digital glove 100 can include flex sensors 106 for measuring the flex in a user's distal interphalangeal ("DIP") joint 108A, proximal interphalangeal ("PIP") joint 108B, metacarpophalangeal ("MCP") joint 108C, interphalangeal ("IP") joint 108D, or metacarpophalangeal ("MCP") joint 108E.

Tactile pressure sensors 104 (which might be referred to herein as "pressure sensors 104") can also be mounted in the fingertips of the digital glove 100 to sense the amount of pressure exerted by the fingertips of a wearer. In the example configuration shown in FIG. 1, only a single pressure sensor 104B has been illustrated in the tip of the index finger 102B of the digital glove 100 for ease of reference. It is to be appreciated, however, that the digital glove 100 can be configured with one or more pressure sensors 104 in the tips of each of the fingers 102A-102D. Pressure sensors can be mounted at other positions in the digital glove 100 in other configurations.

The digital glove 100 might also include an inertial measurement unit ("IMU") 110. The IMU 110 can detect the pronation and supination of the wearer's hand. The IMU 110 might be mounted in the digital glove 100 at a location at or around the user's wrist 112. The digital glove 100 can also, or alternately, include other types of sensors in order to detect other aspects of the pose of a user's hand.

The digital glove 100 can also include output devices, such as one or more haptic devices 124B, to provide feedback to a wearer. For example, the digital glove 100 can include haptic devices 124B, such as those including LRA, ERM, voice-coil, and various types of actuating hardware. In the example configuration shown in FIG. 1, only a single haptic device 124B has been illustrated in the tip of the index finger 102B of the digital glove 100 for ease of reference. It is to be appreciated, however, that the digital glove 100 can be configured with one or more haptic devices 124 in the tips of each of the fingers 102A-102D. Haptic devices 124 can be mounted at other positions in the digital glove 100 in other configurations.

As illustrated in FIG. 1, the digital glove 100 is also equipped with a main board 114. The main board 114 is a circuit board that receives sensor data 128 from the digital glove 100. For example, the main board 114 can receive pressure data 116 describing the pressure exerted by a user's fingers from the pressure sensors 104. The main board 114 also receives flex data 118 describing the flex in a user's fingers from the flex sensors 106. The main board 114 also receives IMU data 120 describing the pronation and supination of a user's hand. The main board 114 can receive other types of sensor data 128 describing other aspects of the pose of a user's hand from other types of sensors in other configurations.

As also shown in FIG. 1, the main board 114 is connected to a host computer 122 via a wired or wireless connection. The host computer 122 can be any type of computer including, but not limited to, a desktop computer, laptop computer, smartphone, tablet computer, electronic whiteboard, video game system, and augmented or virtual reality systems. The main board 114 includes appropriate hardware to transmit sensor data 128 to the host computer 122. For example, the digital glove 100 can transmit the pressure data 116, flex data 118, and IMU data 120 to the host computer 122 for processing in the manner described below. The main board 114 of the digital glove 100 can also receive haptic commands 126 from the host computer 122 instructing the digital glove 100 to activate one or more of the haptic devices 124.

The digital glove 100 can be calibrated prior to use in order to provide accurate measurements for the motion and pressure of a particular user's hand. For instance, the digital glove 100 might be calibrated based upon the flex of a particular user's hand and/or the amount of pressure exerted by the user. The digital glove 100 might be re-calibrated when another user utilizes the digital glove 100.

Although illustrated in FIG. 1 as encompassing all five of a user's fingers, the digital glove 100 might encompass fewer fingers in other configurations. The digital glove 100 can be constructed from cloth, leather, or another type of material. In some configurations, all or a portion of the material is conductive such that a user of the glove 100 can interact with a capacitive touchscreen device while wearing the glove 100. The digital glove 100 might be battery powered or powered by a cable from the host computer 122. In this regard, it is to be appreciated that the configuration of the digital glove 100 shown in FIG. 1 has been simplified for ease of discussion and might include additional or alternate components in other configurations. As will be described in detail below with regard to FIGS. 2-7, the digital glove 100 and the host computer 122 can be configured to augment the functionality of non-digital objects such as, but not limited to, cups, non-digital writing implements, notebooks, planar surfaces like tables, and others.

Figure 2:
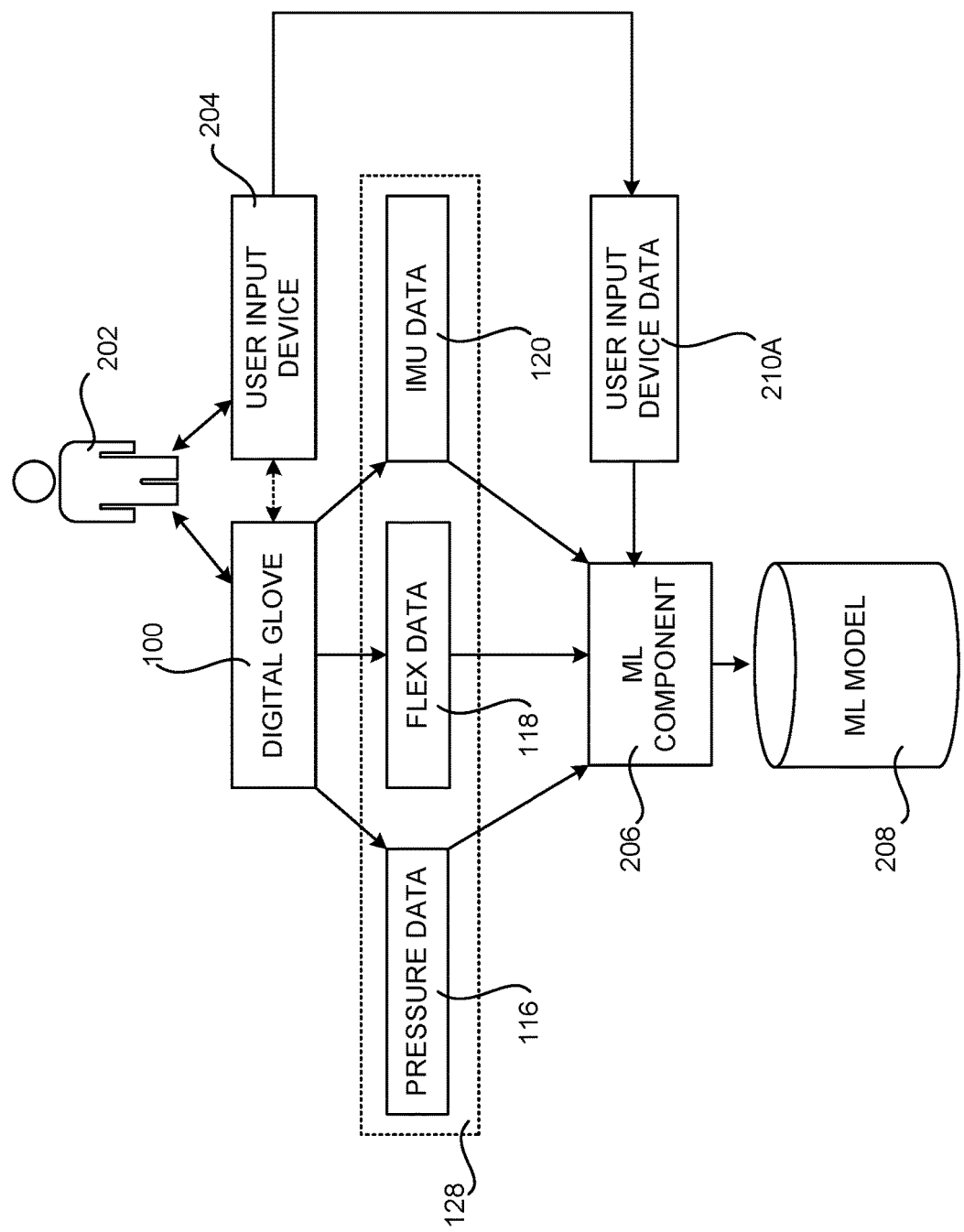
FIG. 2 is a computing system architecture diagram showing aspects of a computing system configured for training a machine learning model for use in augmenting the functionality provided by non-digital objects using a digital glove.

FIG. 2 is a computing system architecture diagram showing aspects of a computing system configured for training a machine learning ("ML") model 208 for use in augmenting the functionality provided by non-digital objects using a digital glove 100. In one configuration, the ML model 208 is trained using sensor data 128 generated by a digital glove 100 when a user 202 wearing the digital glove 100 utilizes their gloved hand to manipulate a user input device 204. For example, the pressure data 116, flex data 118, and IMU data 120 generated by the digital glove 100 when the user 202 manipulates the user input device 204 can be provided to a ML component 206 capable of training the ML model 208.

As shown in FIG. 2, the output of the user input device 204 (i.e. the user input device data 210A) is also utilized to train the ML model 208. Using this data and the sensor data 128, a ML model 208 can be trained that maps the sensor data 128 obtained from a digital glove 100 to movement intent (e.g. the rotation of a dial or movement of a mouse) as indicated by the user input device data 210A. Various ML algorithms can be utilized to train the ML model 208 including, but not limited to, support vector machines, linear regression, logistic regression, naive Bayes, linear discriminant analysis, decision trees, k-nearest neighbor algorithm, or neural networks.

Figure 3A:
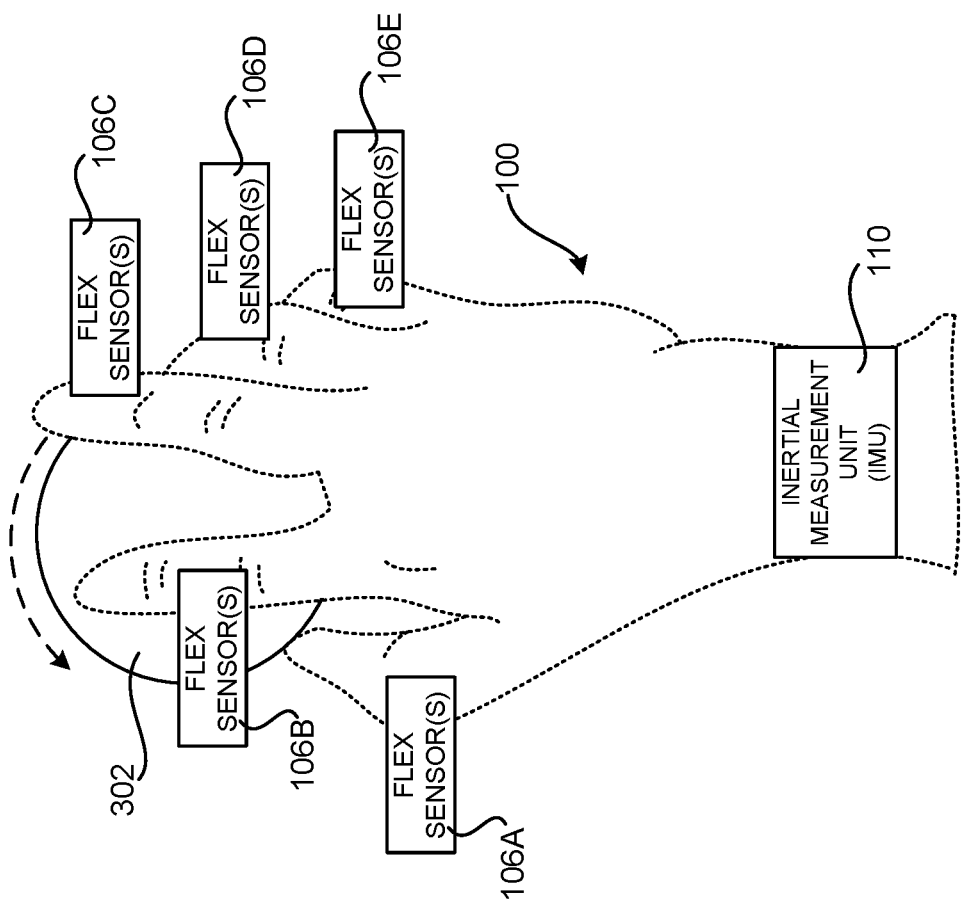
FIGS. 3A-3C illustrate several examples of different user input devices being utilized to train a machine learning model for use in augmenting the functionality provided by non-digital objects using a digital glove.

In one specific example, shown in FIG. 3A, a wearer of a digital glove 100 operates a digital dial 302 by spinning the digital dial 302 in different directions and at different speeds. The digital dial 302 might be a SURFACE DIAL from MICROSOFT CORPORATION or another type of digital dial from another manufacturer.

As discussed briefly above, sensor data 128 is collected from the sensors in the digital glove 100 while the user is spinning the digital dial 302. For example, flex data 118 describing the flex in the wearer's fingers while spinning the digital dial 302 can be collected from the flex sensors 106A-106E. Pressure data 116 and IMU data 120 can also be collected in some configurations.

As also mentioned above, data 210A that is output by the digital dial 302 is also collected from the digital dial 302 during manipulation by the user 202. The ML model 208 can then be trained on the sensor data 128 obtained from the digital glove 100 and the corresponding user input device data 210A obtained from the digital dial 302 during manipulation.

Figure 3B:
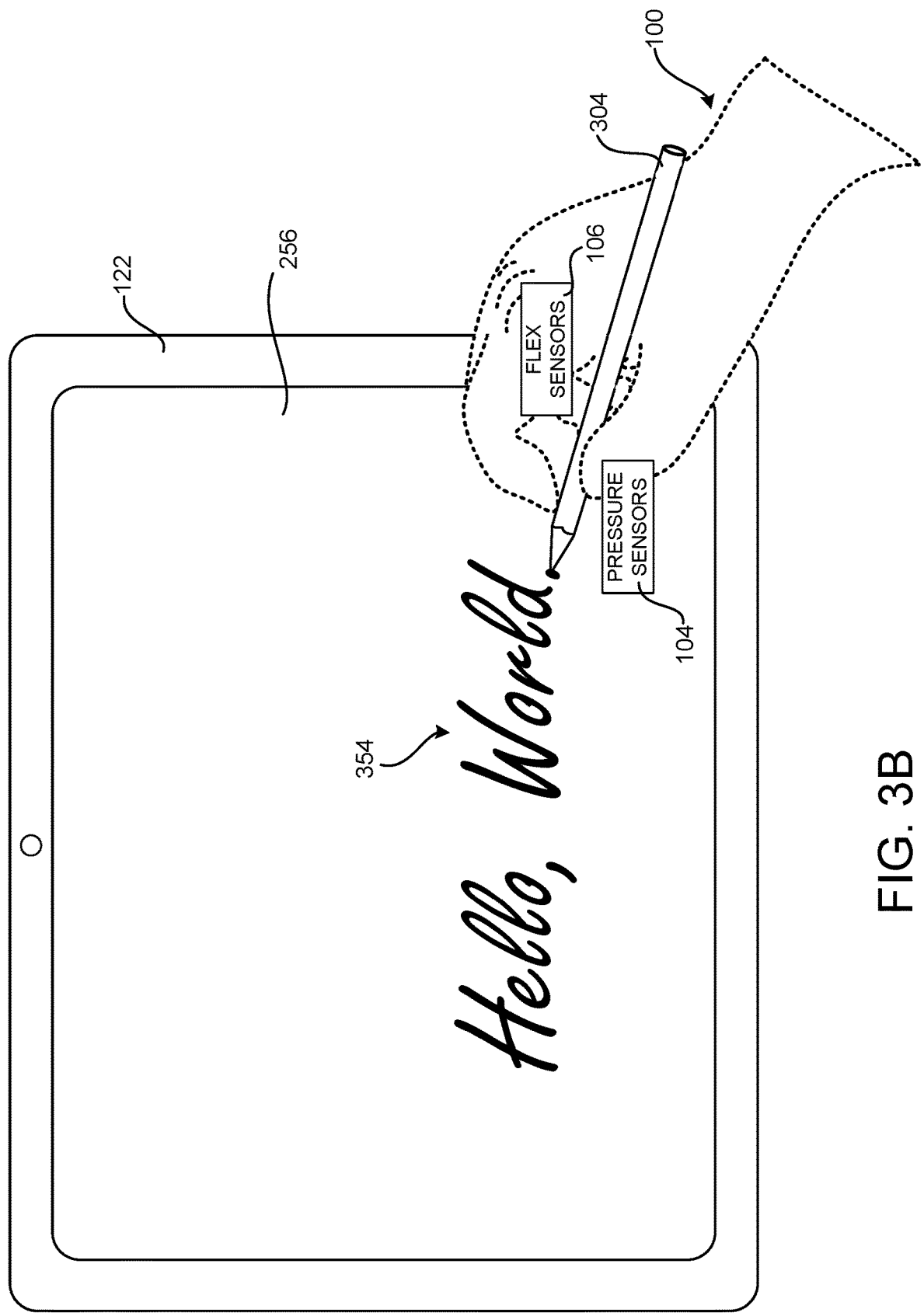

In the example shown in FIG. 3B, a wearer of a digital glove 100 writes digital ink 354 with a digital pen 304 on the touchscreen 256 of a host computer 122 while wearing the digital glove 100. The digital pen 304 might be a SURFACE PEN from MICROSOFT CORPORATION or another type of digital pen from another manufacturer.

As in the example given above, sensor data 128 is collected from the sensors in the digital glove 100 while the user is writing with the digital pen 304. For example, flex data 118 describing the flex in the wearer's fingers while writing with the digital pen 304 can be collected from the flex sensors 106A-106E. Pressure data 116 and IMU data 120 can also be collected from the digital glove while the user 202 writes with the digital pen 304 in some configurations.

Data 210A that is output by the touchscreen 256 as a result of the user 202 writing on the touchscreen 256 with the digital pen 304 is also collected from the touchscreen 256 while the user is writing on the touchscreen 256. The ML model 208 can then be trained on the sensor data 128 obtained from the digital glove 100 and the corresponding user input device data 210A obtained from the touchscreen 256 during manipulation. In this way, a ML model 208 can be trained that maps the sensor data 128 obtained from a digital glove 100 to writing intent (e.g. the movement of the digital pen 304) as indicated by the user input device data 210A.

Figure 3C:
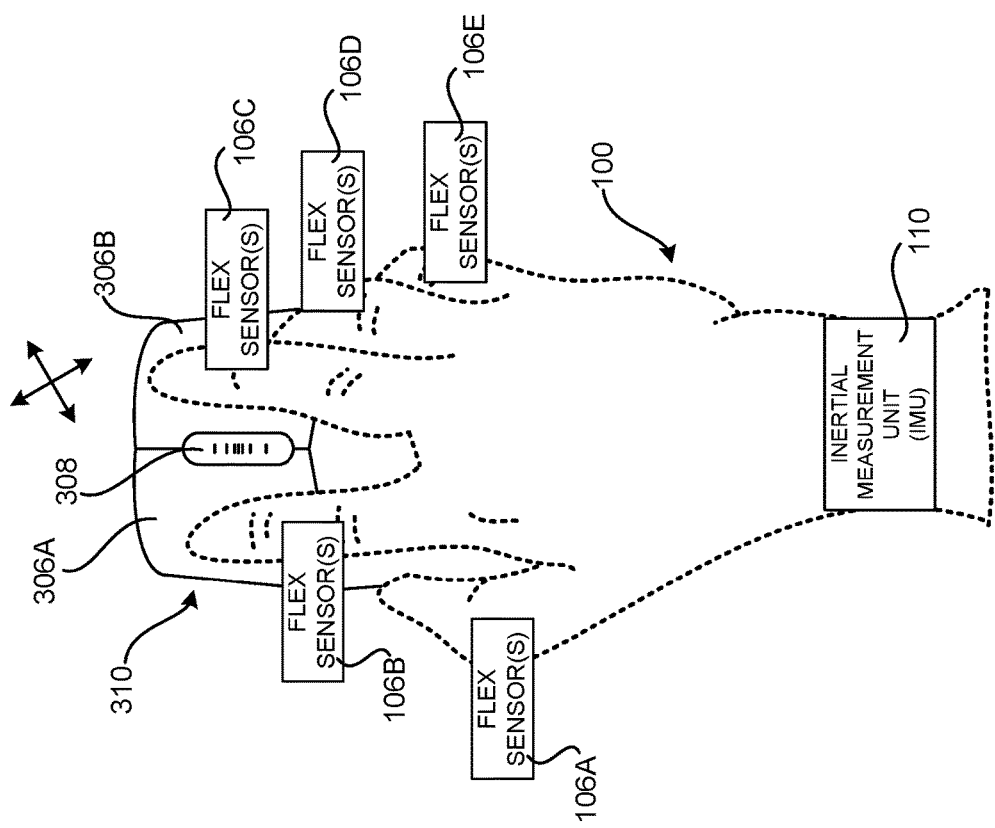

In the example shown in FIG. 3C, a wearer of a digital glove 100 manipulates a mouse 310 while wearing the digital glove 100. As in the examples given above, sensor data 128 is collected from the sensors in the digital glove 100 while the user 202 is manipulating the mouse 2310 For example, flex data 118 describing the flex in the wearer's fingers while manipulating the mouse 310 can be collected from the flex sensors 106A-106E. Pressure data 116 can also be obtained from the digital glove 100 when the user 202 moves the mouse 310, when the user 202 presses either of the buttons 306A or 306B on the mouse, or manipulates the wheel 308 of the mouse 310. IMU data 120 can also be collected from the digital glove while the user 202 manipulates the mouse 310 in some configurations.

Data 210A that is output by the mouse 310 as a result of the user 202 manipulating the mouse 310 is also collected from the mouse 310. The ML model 208 can then be trained on the sensor data 128 obtained from the digital glove 100 and the corresponding user input device data 210A obtained from the mouse 310 during manipulation. In this way, a ML model 208 can be trained that maps the sensor data 128 obtained from a digital glove 100 to movement or input intent (e.g. the movement of the mouse 310 or selection of a mouse button) as indicated by the collected user input device data 210A. As will be described in greater detail below with regard to FIGS. 5-7, the trained ML model 208 can be utilized to augment the functionality provided by non-digital objects using a digital glove 100. It is to be appreciated that the ML model can be trained in other configurations using sensor data 128 obtained from the digital glove 100 while the digital glove 100 is used to manipulate a non-digital object.

Figure 4:
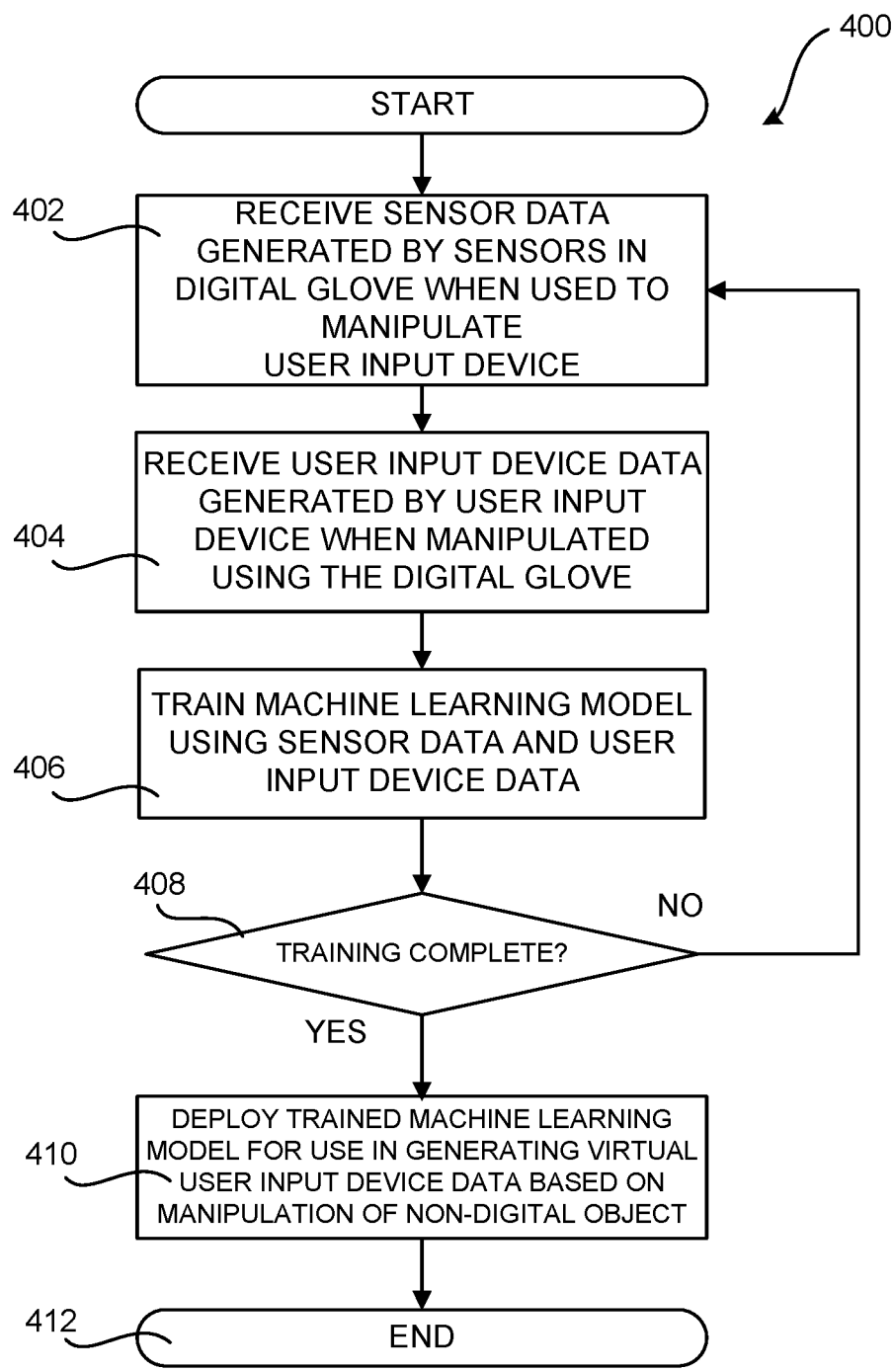
FIG. 4 is a flow diagram showing a routine that illustrates aspects of one mechanism for training a machine learning model for use in augmenting the functionality provided by non-digital objects using a digital glove.

FIG. 4 is a flow diagram showing a routine 400 that illustrates aspects of one mechanism for training a ML model 208 for use in augmenting the functionality provided by non-digital objects 502 using a digital glove 100. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where sensor data 128 generated by sensors in a digital glove 100 is received while a wearer of the digital glove 100 utilizes their gloved hand to manipulate a user input device 204 such as, but not limited to, the digital dial 302, digital pen 304 and touchscreen 256, and mouse 310 described above. The routine 400 then proceeds from operation 402 to operation 404.

At operation 404, user input device data 210A is received from the user input device 204 while the wearer of the digital glove 100 manipulates the user input device 204 with their gloved hand. The routine 400 then proceeds from operation 404 to operation 406.

At operation 406, the ML model 208 is trained using the sensor data obtained at operation 402 and the user input device data 210 obtained at operation 404. The routine 400 then proceeds from operation 406 to operation 408, where a determination is made as to whether the ML model 208 has been sufficiently well trained. For example, a determination can be made as to whether the ML model 208 can correlate sensor data 128 generated by the digital glove 100 with user input device data 210A received from a user input device within a certain range of accuracy. If training of the ML model 208 has completed, the routine 400 proceeds from operation 408 to operation 410. Otherwise, the routine 400 proceeds back to operation 402, where training of the ML model 208 can continue in the manner described above.

At operation 410, the trained ML model 208 can be deployed to a host computer 122 for use in generating virtual user input device data (described below) based upon sensor data 128 received from a digital glove 100 while a wearer of the digital glove 100 manipulates a non-digital object with their gloved hand. The routine 400 then proceeds from operation 410 to operation 412, where it ends.

Figure 5:
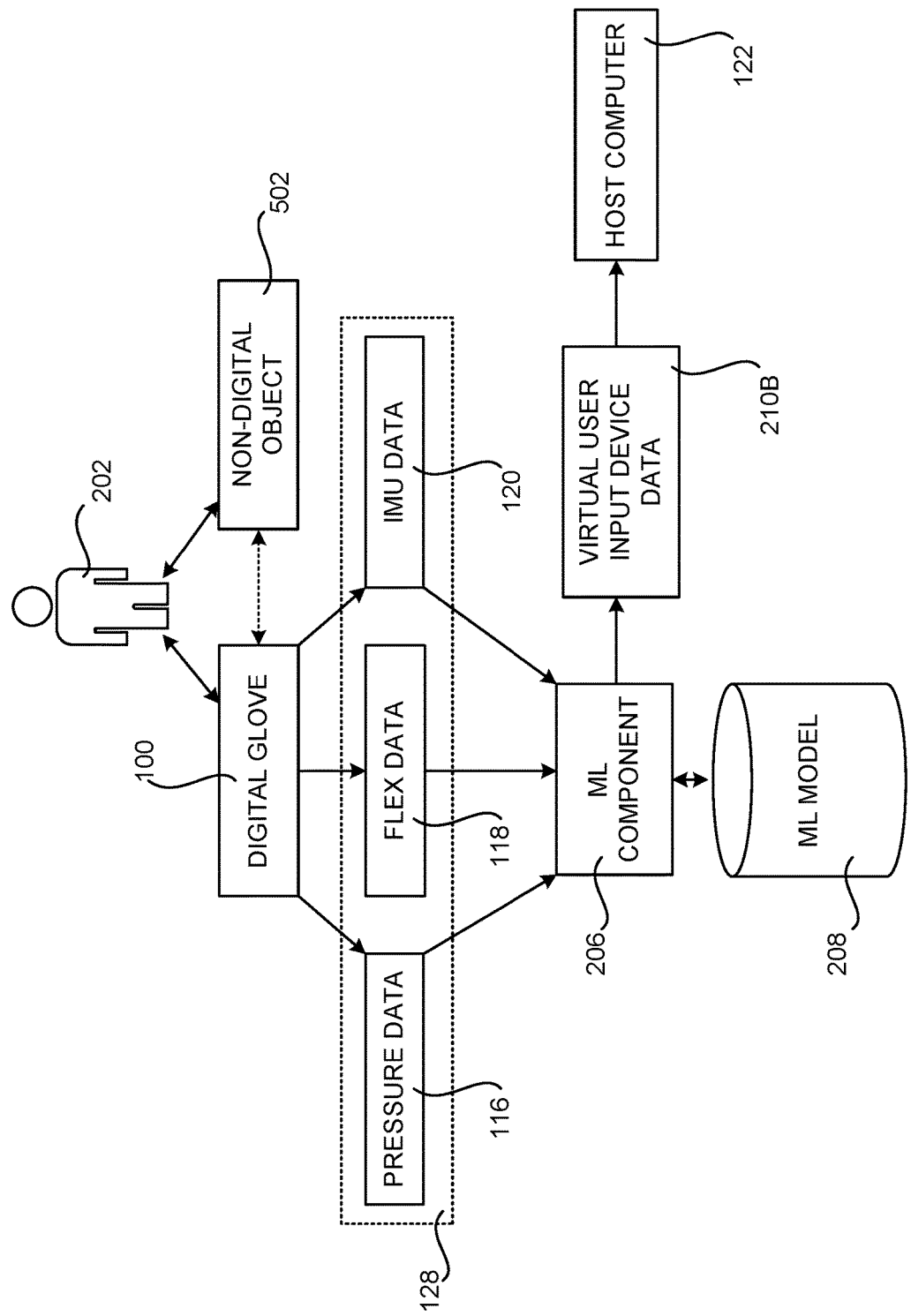
FIG. 5 is a computing system architecture diagram showing aspects of a computing system configured to augment the functionality provided by non-digital objects using a digital glove.

FIG. 5 is a computing system architecture diagram showing aspects of a computing system configured to augment the functionality provided by a non-digital object 502 using a digital glove 100. A non-digital object 502 is an object that includes no circuitry. Examples of non-digital objects 502 include, but are not limited to, coffee cups, pens and pencils, blocks of wood, planar surfaces like tables or notebooks, and others.

As described above, the trained ML model 208 can take sensor data 128 generated by a digital glove 100 while the glove is used to manipulate a non-digital object 502 and generate virtual user input device data 210B that can be utilized to control a host computer 122. The virtual user input device data 210B appears to the host computer 122 as if it were being generated by a user input device 204.

Figure 6A:
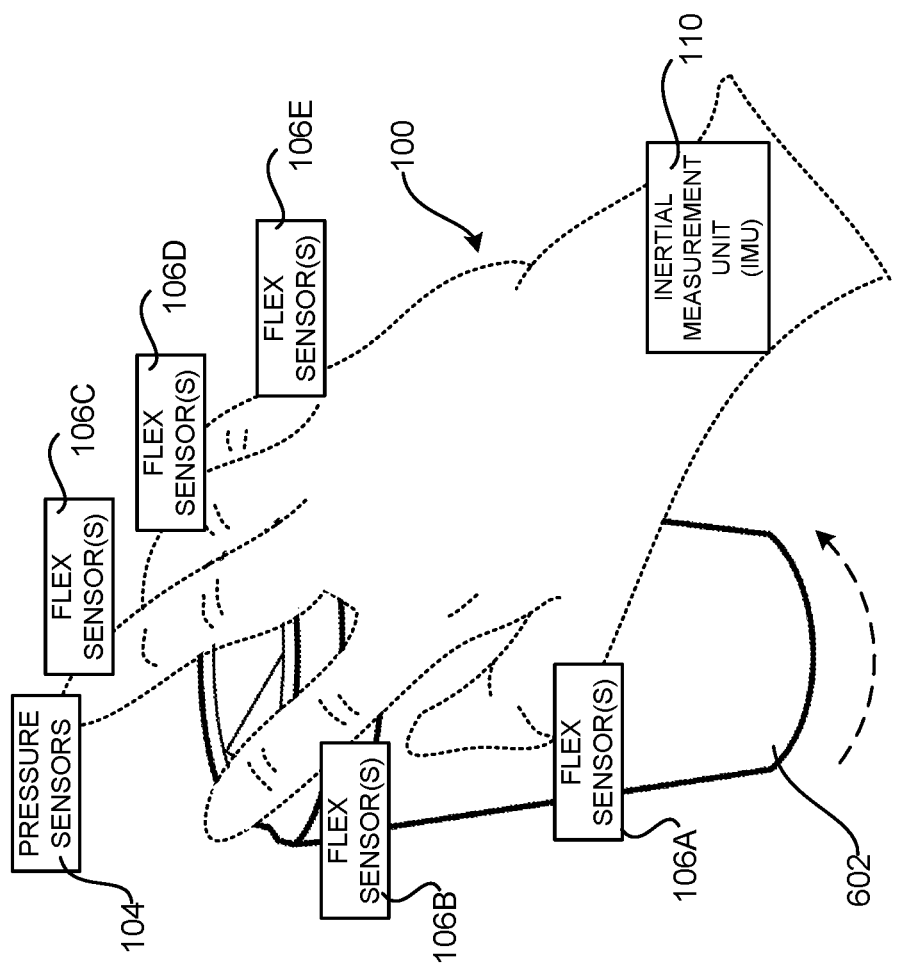
FIGS. 6A-6C illustrate several examples of different non-digital objects being utilized to control a host computer.

In the example shown in FIG. 6A, for instance, the ML model 208 has been trained using a digital dial 302 in the manner described above with regard to FIG. 3A. In this example, a wearer of a digital glove 100 might rest their gloved hand on a non-digital object 502, such as a coffee cup 602 in this case. The user might then rotate the coffee cup 602 in a manner similar to that used to rotate a digital dial 302. Sensor data 128 generated by the sensors in the digital glove 100 are obtained while the user is rotating the coffee cup 602. The sensor data 128 can then be input to the trained machine learning model 208 which, in turn, outputs virtual user input device data 210B. The virtual user input device data 210B can then be utilized to control the host computer 122. In this way, the coffee cup 602 can be utilized to control aspects of the operation of the host computer 122 in the same way that a digital dial 302 would.

Figure 6B:
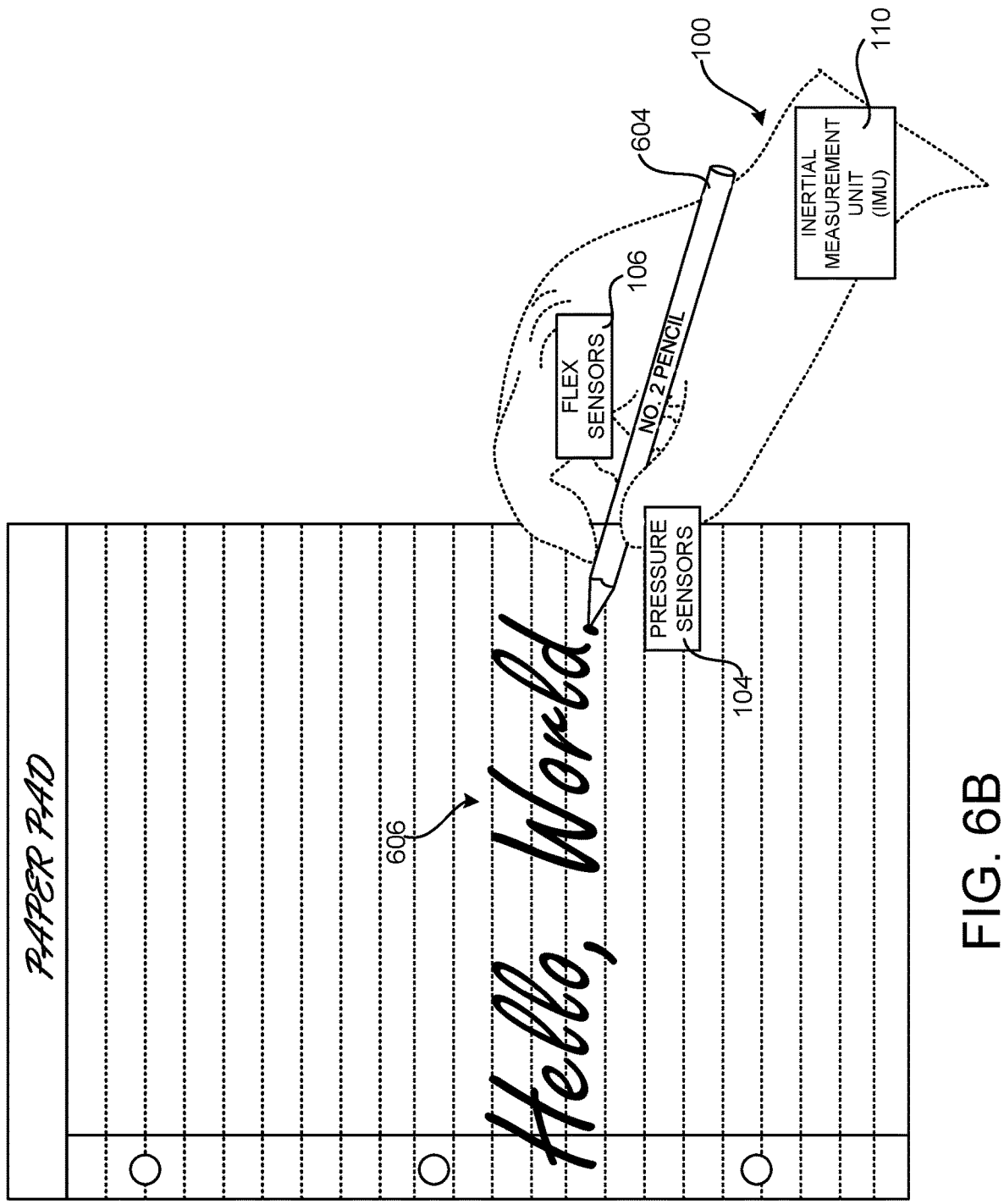

In the example shown in FIG. 6B, the ML model 208 has been trained using a digital pen 304 in the manner described above with regard to FIG. 3B. In this example, a wearer of a digital glove 100 might utilize a non-digital object 502 with their gloved hand, a pencil 604 in this case, to write text 606 on a piece of paper. Sensor data 128 generated by the sensors in the digital glove 100 are obtained while the user is writing. The sensor data 128 can then be input to the trained machine learning model 208 which, in turn, outputs virtual user input device data 210B. The virtual user input device data 210B can then be utilized to generate digital ink or other types of input at the host computer 202. In this way, the pencil 604 can be utilized to control aspects of the operation of the host computer 122 in the same way that a digital pen 304 would.

Figure 6C:
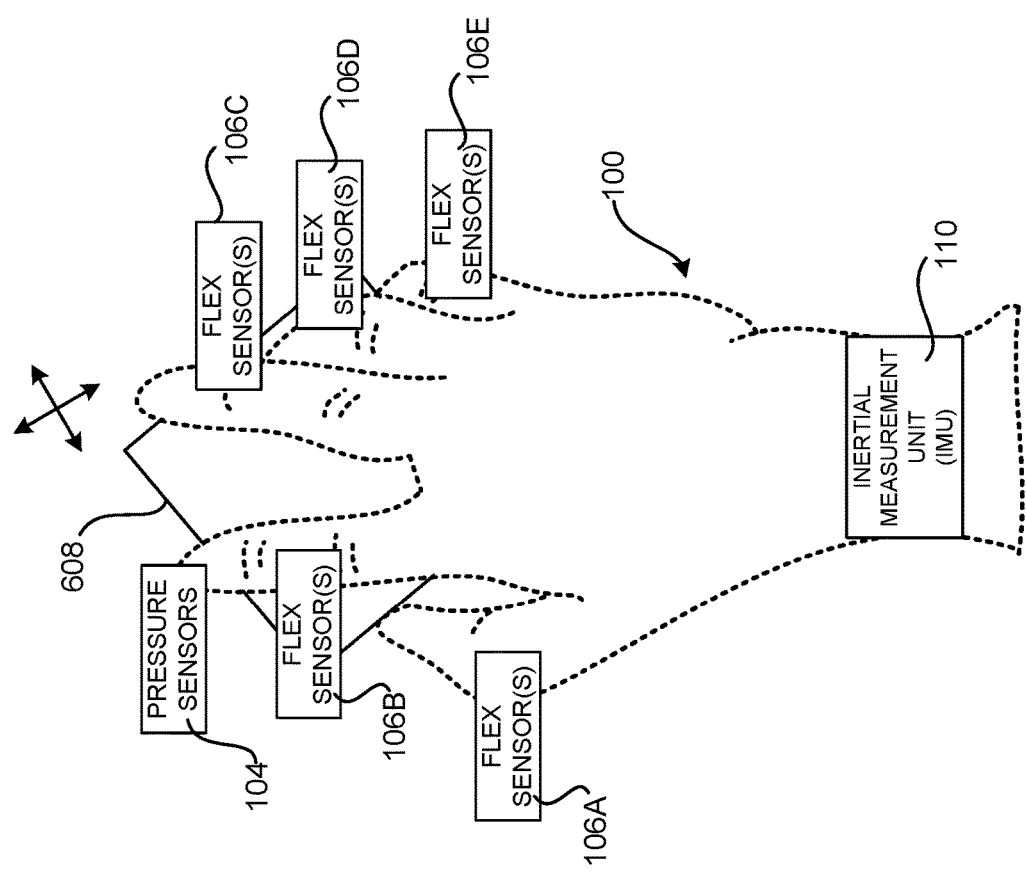

In the example shown in FIG. 6C, the ML model 208 has been trained using a mouse 310 in the manner described above with regard to FIG. 3C. In this example, a wearer of a digital glove 100 might rest their gloved hand on a non-digital object 502, such as a block of wood 608 in this case. The user might then move the block of wood 608 in a manner similar to that used when moving a mouse 310. Sensor data 128 generated by the sensors in the digital glove 100 are obtained while the user is moving the block of wood 608. The sensor data 128 can then be input to the trained machine learning model 208 which, in turn, outputs virtual user input device data 210B. The virtual user input device data 210B can then be utilized to control the host computer 122. In this way, the block of wood 608 can be utilized to control aspects of the operation of the host computer 122 in the same way that a digital mouse 310 would.

As described briefly above, a digital glove 100 can also be utilized to perform selection operations, such as a click of a mouse button 306 or digital dial button, using non-digital objects. For example, pressure data 116 can be obtained from the pressure sensors 104 of a digital glove 100 while the digital glove 100 is being used to manipulate a non-digital object 502. For instance, pressure data 116 might be obtained while the user 202 is holding the coffee cup 602, the pencil 604, or the block of wood 608.

A host computer 122 can then determine if pressure data 116 generated by one or more of the pressure sensors 104 in the digital glove 100 indicates that pressure was exerted at one of the fingers in excess of a threshold value. If so, the host computer 122 can perform a selection operation. Continuing the example above, for instance, a user holding a coffee cup 602 with their gloved hand might exert pressure on the cup 602 using one of their fingers. If the pressure exceeds a threshold value, a selection operation will be performed on the host computer 112 in the same manner as if the user had clicked the button on a digital dial 302. A command might also be provided to the digital glove 100 to provide haptic feedback to the wearer of the glove 100 in the event that pressure in excess of a threshold value is detected at one of the fingers. Selection operations can be detected in a similar manner on the pencil 604, the block of wood 608, or other type of non-digital item.

Figure 7:
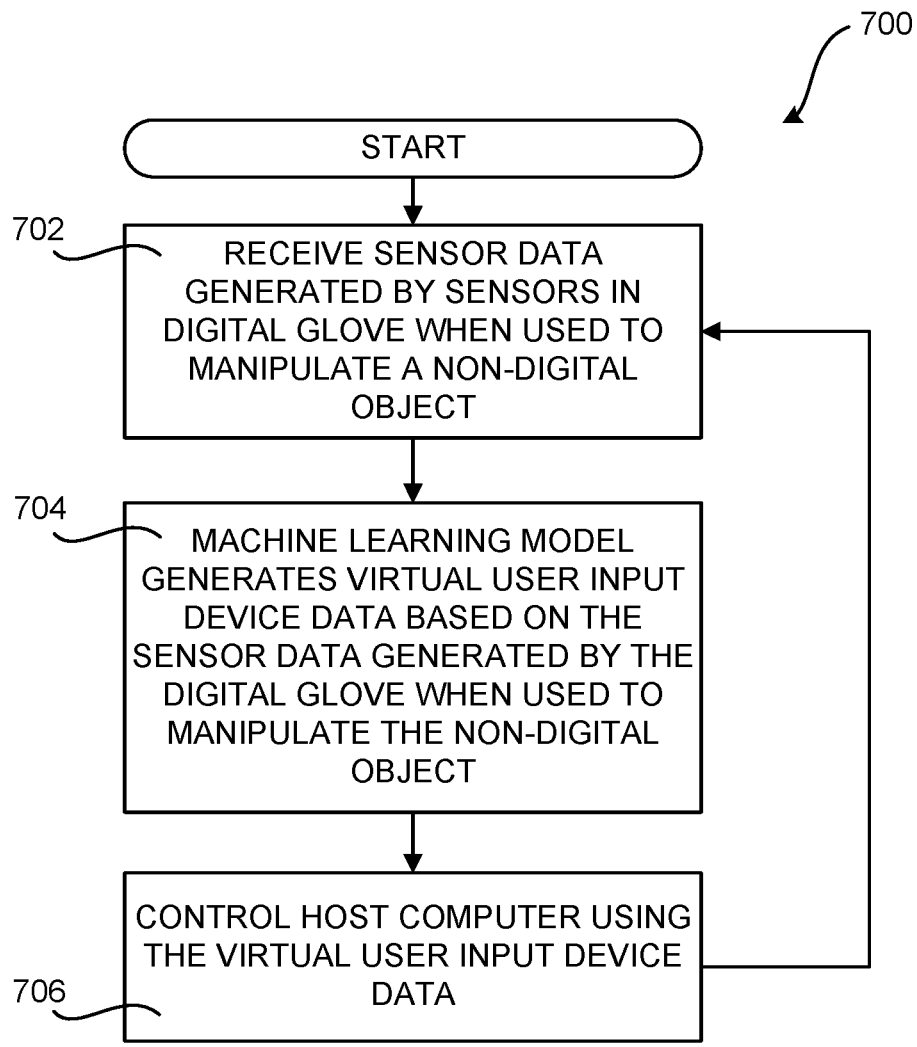
FIG. 7 is a flow diagram showing a routine that illustrates aspects of the operation of a digital glove for controlling a host computer using non-digital objects.

FIG. 7 is a flow diagram showing a routine 700 that illustrates aspects of the operation of a digital glove 100 and a host computer 122 for controlling aspects of the operation of the host computer 122 using non-digital objects 502. The routine 700 begins at operation 702, where sensor data 128 is received from the digital glove 100 while the digital glove 100 is used to manipulate a non-digital object 502, such as those described above. The routine 700 then proceeds from operation 702 to operation 704.

At operation 704, the trained ML model 208 generates virtual user input device data 210B based on the sensor data 128 generated by the digital glove 100 when the glove 100 is utilized to manipulate a non-digital object 502. The routine 700 then proceeds from operation 704 to operation 706.

At operation 706, the virtual user input device data 210B can be utilized to control aspects of the operation of a host computer 122 coupled to the digital glove 100. For example, if the non-digital object 502 is a coffee cup 602, the virtual user input device data 210B might be utilized to scroll the view of a document or web page. If the non-digital object 502 is a pen or pencil 604, the virtual user input device data 210B might be utilized to generate digital ink. If the non-digital object 502 is a block of wood 608, the virtual user input device data 210B might be utilized to move a mouse cursor. Other types of functions can be performing in response to the utilization of other types of non-digital objects 502 in other configurations.

From operation 706, the routine 700 proceeds back to operation 702, where the non-digital object 502 can continue to be utilized to control the host computer 122 in the manner described above.

Figure 8:
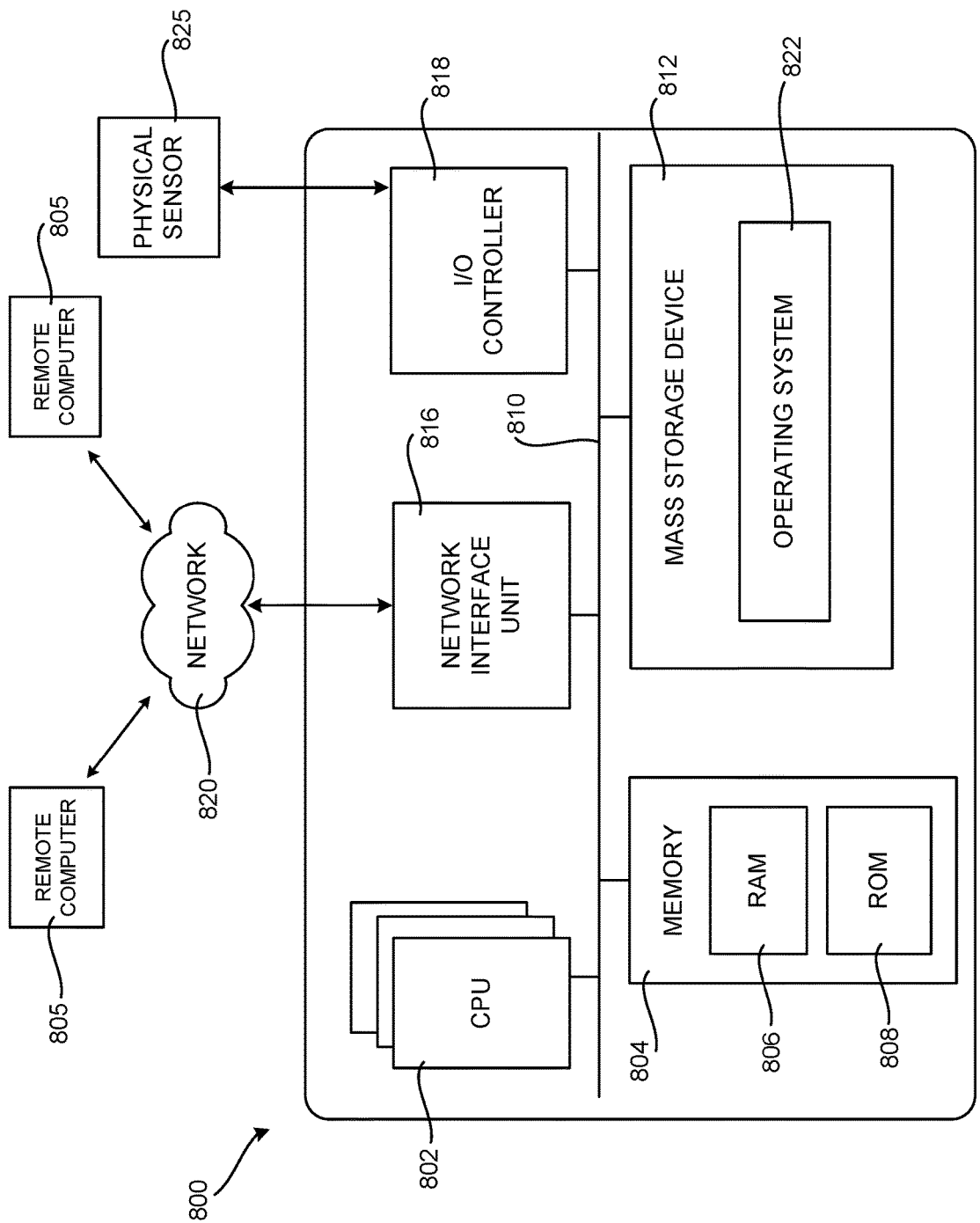
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a host computer 122 that can implement the various technologies presented herein. In particular, the architecture of the computer 800 illustrated in FIG. 8 can be utilized to implement a server computer, mobile phone, an e-reader, a smartphone, a desktop computer, an AR/VR device, a tablet computer, a laptop computer, or another type of computing device.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs, and other types of programs. The mass storage device 812 can also be configured to store other types of programs and data.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices, including a keyboard, mouse, touch input, an electronic stylus (not shown in FIG. 8), or a physical sensor such as a video camera. Similarly, the input/output controller 818 can provide output to a display screen or other type of output device (also not shown in FIG. 8).

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
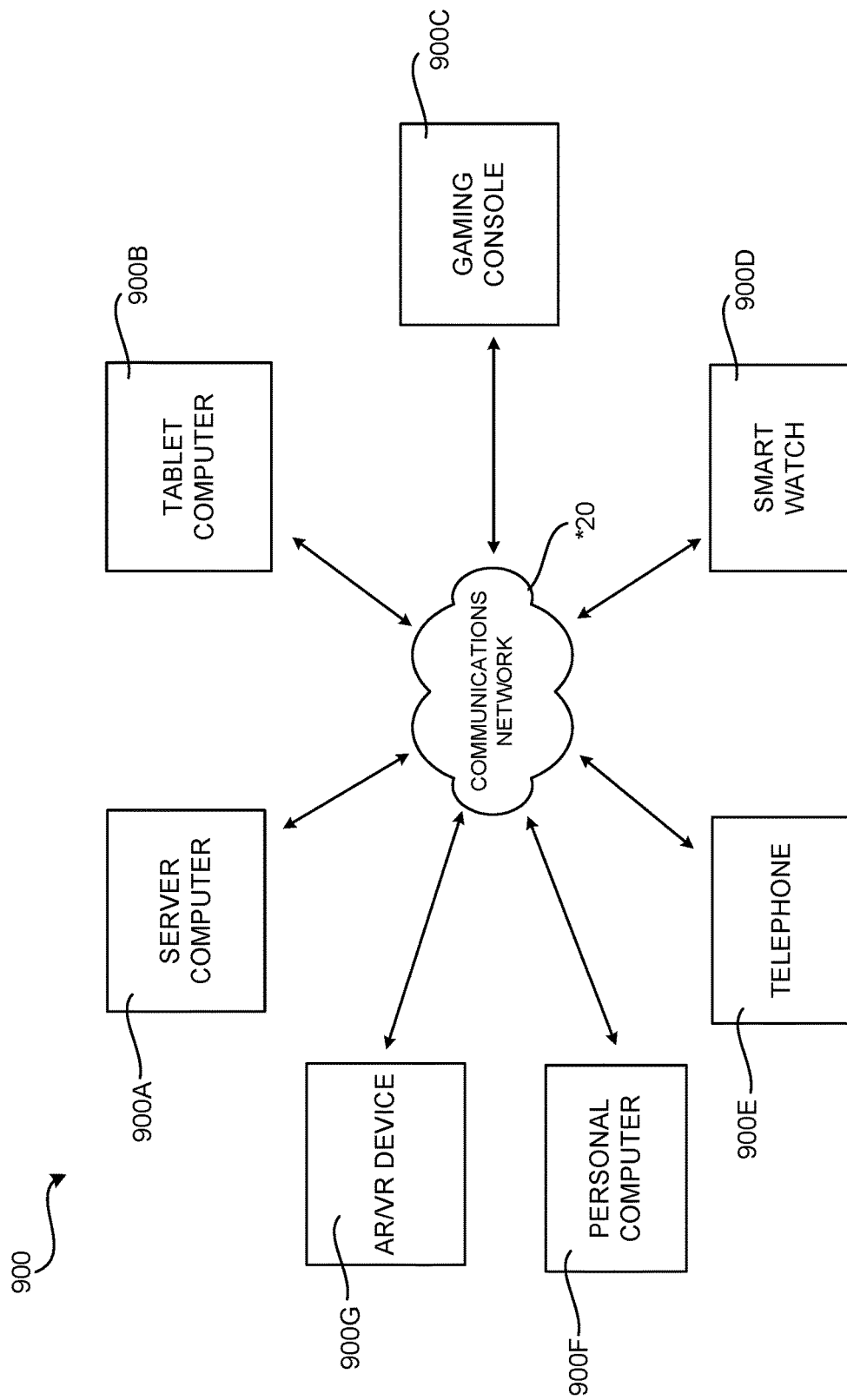
FIG. 9 is a network diagram illustrating a distributed computing environment in which aspects of the disclosed technologies can be implemented.

FIG. 9 is a network diagram illustrating a distributed network computing environment 900 in which aspects of the disclosed technologies can be implemented, according to various embodiments presented herein. As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the client computing devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a client computing device 900B-900G to obtain desired data and/or perform other computing applications.

The data and/or computing applications may be stored on the server 900A, or servers 900A, and communicated to cooperating users through the client computing devices 900B-900G over an exemplary communications network 820. A participating user (not shown in FIG. 9) may request access to specific data and applications housed in whole or in part on the server computer 8800A. These data may be communicated between the client computing devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: receiving sensor data generated by sensors in a digital glove while the digital glove is utilized to manipulate a non-digital object; running a machine learning model to generate virtual user input device data based on the sensor data generated by the sensors in the digital glove while the digital glove is utilized to manipulate the non-digital object, the machine learning model being trained on sensor data generated by the sensors in the digital glove while the digital glove is utilized to manipulate an object; and controlling a host computer using the virtual user input device data.

Clause 2. The computer-implemented method of clause 1, wherein the sensor data generated by the digital glove comprises pressure data generated by one or more pressure sensors of the digital glove.

Clause 3. The computer-implemented method of any of clauses 1-2, wherein the sensor data generated by the digital glove comprises flex data generated by one or more flex sensors of the digital glove.

Clause 4. The computer-implemented method of any of clauses 1-3, wherein the sensor data generated by the digital glove comprises inertial measurement unit (IMU) data generated by an IMU of the digital glove.

Clause 5. The computer-implemented method of any of clauses 1-4, wherein the object comprises a user input device, and wherein the user input device comprises a digital dial.

Clause 6. The computer-implemented method of any of clauses 1-5, wherein the object comprises a user input device, and wherein the user input device comprises a digital pen.

Clause 7. The computer-implemented method of any of clauses 1-6, wherein the object comprises a user input device, and wherein the user input device comprises a mouse.

Clause 8. A computing device, comprising: a processor; and a memory storing instructions executable by the processor to: obtain sensor data from a digital glove coupled to the computing device, wherein the digital glove comprises a plurality of fingers, each of the plurality of fingers comprising a plurality of sensors configured to generate the sensor data, and wherein the sensor data is obtained from the sensors in the digital glove while the digital glove is utilized to manipulate a non-digital object; execute a machine learning model to generate virtual user input device data based on the sensor data obtained from the sensors in the digital glove while the digital glove is utilized to manipulate the non-digital object; and control the computing device using the virtual user input device data.

Clause 9. The computing device of clause 8, wherein the sensor data generated by the digital glove comprises pressure data generated by one or more pressure sensors of the digital glove, flex data generated by one or more flex sensors of the digital glove, or inertial measurement unit (IMU) data generated by an IMU of the digital glove Clause 10. The computing device of any of clauses 8-9, wherein the memory stores further instructions executable by the processor to: determine if pressure data generated by the one or more pressure sensors indicates pressure exerted at one of the fingers in excess of a threshold value; and initiate an operation at the computing device responsive to determining that the pressure data generated by the one or more pressure sensors indicates pressure exerted by one of the fingers in excess of a threshold value.

Clause 11. The computing device of any of clauses 8-10, wherein the digital glove further comprises one or more haptic devices in the plurality of fingers, and wherein the memory stores further instructions executable by the processor to: initiate feedback by the one or more haptic devices based upon the sensor data obtained from the sensors.

Clause 12. The computing device of any of clauses 8-11, wherein the machine learning model is trained on sensor data generated by the sensors in the digital glove and data generated by a digital dial while the digital glove is utilized to manipulate the digital dial.

Clause 13. The computing device of any of clauses 8-12, wherein the machine learning model is trained on sensor data generated by the sensors in the digital glove and data generated by a digital pen while the digital glove is utilized to manipulate the digital pen.

Clause 14. The computing device of any of clauses 8-13, wherein the machine learning model is trained on sensor data generated by the sensors in the digital glove and data generated by a mouse while the digital glove is utilized to manipulate the mouse.

Clause 15. The computing device of any of clauses 8-14, wherein the non-digital object comprises a cup or a non-digital writing implement.

Clause 16. A computer-readable storage medium having computer-executable instructions stored thereupon which, when executed by a processor, cause the processor to: obtain sensor data from a digital glove coupled to a computing device, wherein the digital glove comprises a plurality of fingers, each of the plurality of fingers comprising a plurality of sensors configured to generate the sensor data, and wherein the sensor data is obtained from the sensors in the digital glove while the digital glove is utilized to manipulate a non-digital object; execute a machine learning model to generate virtual user input device data based on the sensor data obtained from the sensors in the digital glove while the digital glove is utilized to manipulate the non-digital object; control the computing device using the virtual user input device data.

Clause 17. The computer-readable storage medium of clause 16, wherein the sensor data generated by the digital glove comprises pressure data generated by one or more pressure sensors of the digital glove, flex data generated by one or more flex sensors of the digital glove, or inertial measurement unit (IMU) data generated by an IMU of the digital glove.

Clause 18. The computer-readable storage medium of any of clauses 16-17, having further computer-executable instructions stored thereupon to: determine if pressure data generated by the one or more pressure sensors indicates pressure exerted at one of the fingers of the digital glove in excess of a threshold value; and initiate a selection operation at the computing device responsive to determining that the pressure data generated by the one or more pressure sensors indicates pressure exerted by one of the fingers in excess of a threshold value.

Clause 19. The computer-readable storage medium of any of clauses 16-18, wherein the machine learning model is trained on sensor data generated by the sensors in the digital glove and data generated by a user input device while the digital glove is utilized to manipulate wherein the user input device.

Clause 20. The computer-readable storage medium of any of clauses 16-19, wherein the object comprises a user input device, and wherein the non-digital object comprises a cup or a non-digital writing implement.

Based on the foregoing, it should be appreciated that technologies for augmenting the functionality provided by non-digital objects using a digital glove have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
receiving sensor data generated by sensors in a digital glove while the digital glove is utilized to manipulate a digital input device;
training a machine learning model using an output of the digital input device that correlates with the sensor data defining a flex or a pressure associated with at least one finger of a user while the digital glove is utilized to manipulate the digital input device, wherein the machine learning model maps the sensor data received from the digital glove to rotation intent of the digital input device;
receiving subsequent sensor data generated by the sensors in the digital glove while the digital glove is utilized to manipulate a real-world non-digital object;
running the machine learning model to generate input device data that simulates the output of the digital input device based on a correlation between the subsequent sensor data defining a current flex or a current pressure associated with the at least one finger of the user and the flex or the pressure associated with the at least one finger of the user while the digital glove is utilized to manipulate the digital input device; and
controlling a host computer using the input device data based on the digital glove being utilized to manipulate the real-world non-digital object.

2. The computer-implemented method of claim 1, wherein the sensor data generated by the sensors in the digital glove comprises pressure data generated by one or more pressure sensors in the digital glove.

3. The computer-implemented method of claim 1, wherein the sensor data generated by the sensors in the digital glove comprises flex data generated by one or more flex sensors in the digital glove.

4. The computer-implemented method of claim 1, wherein the sensor data generated by the sensors in the digital glove comprises inertial measurement unit (IMU) data generated by an IMU in the digital glove.

5. The computer-implemented method of claim 1, wherein the flex is an amount of bend in a joint of the at least one finger of the user.

6. The computer-implemented method of claim 1, wherein the pressure is an amount of pressure at a fingertip of the at least one finger of the user.

7. The computer-implemented method of claim 1, wherein the machine learning model maps the sensor data received from the digital glove to movement intent of the digital input device.

8. A computing device, comprising:
a processor; and
a memory storing instructions executable by the processor to:
receive sensor data generated by sensors in a digital glove while the digital glove is utilized to manipulate a digital input device;
train a machine learning model using an output of the digital input device that correlates with the sensor data defining a flex or a pressure associated with at least one finger of a user while the digital glove is utilized to manipulate the digital input device, wherein the machine learning model maps the sensor data received from the digital glove to rotation intent of the digital input device;
receive subsequent sensor data generated by the sensors in the digital glove while the digital glove is utilized to manipulate a real-world non-digital object;
run the machine learning model to generate input device data that simulates the output of the digital input device based on a correlation between the subsequent sensor data defining a current flex or a current pressure associated with the at least one finger of the user and the flex or the pressure associated with the at least one finger of the user while the digital glove is utilized to manipulate the digital input device; and
control a host computer using the input device data based on the digital glove being utilized to manipulate the real-world non-digital object.

9. The computing device of claim 8, wherein the sensor data generated by the sensors in the digital glove comprises pressure data generated by one or more pressure sensors in the digital glove.

10. The computing device of claim 8, wherein the sensor data generated by the sensors in the digital glove comprises flex data generated by one or more flex sensors in the digital glove.

11. The computing device of claim 8, wherein the digital input device comprises at least one of a digital dial, a digital pen, or a mouse.

12. The computing device of claim 8, wherein the flex is an amount of bend in a joint of the at least one finger of the user.

13. The computing device of claim 8, wherein the pressure is an amount of pressure at a fingertip of the at least one finger of the user.

14. A computer-readable storage medium having computer-executable instructions stored thereupon which, when executed by a processor, cause the processor to:

receive sensor data generated by sensors in a digital glove while the digital glove is utilized to manipulate a digital input device;

train a machine learning model using an output of the digital input device that correlates with the sensor data defining a flex or a pressure associated with at least one finger of a user while the digital glove is utilized to manipulate the digital input device, wherein the machine learning model maps the sensor data received from the digital glove to rotation intent of the digital input device;

receive subsequent sensor data generated by the sensors in the digital glove while the digital glove is utilized to manipulate a real-world non-digital object;

run the machine learning model to generate input device data that simulates the output of the digital input device based on a correlation between the subsequent sensor data defining a current flex or a current pressure associated with the at least one finger of the user and the flex or the pressure associated with the at least one finger of the user while the digital glove is utilized to manipulate the digital input device; and control a host computer using the input device data based on the digital glove is being utilized to manipulate the real-world non-digital object.

15. The computer-readable storage medium of claim 14, wherein the sensor data generated by the sensors in the digital glove comprises pressure data generated by one or more pressure sensors in the digital glove.

16. The computer-readable storage medium of claim 14, wherein the sensor data generated by the sensors in the digital glove comprises flex data generated by one or more flex sensors in the digital glove.

17. The computer-readable storage medium of claim 14, wherein the digital input device comprises at least one of a digital dial, a digital pen, or a mouse.

18. The computer-readable storage medium of claim 14, wherein the flex is an amount of bend in a joint of the at least one finger of the user.

* * * * *